Sept. 24, 1940.   E. C. LADD ET AL   2,215,704
HYDROGEN FLUORIDE TREATMENT OF RUBBER
Filed Jan. 20, 1938

INVENTOR
ELBERT C. LADD AND
NICHOLAS J. RAKAS.
BY
ATTORNEYS.

Patented Sept. 24, 1940

2,215,704

UNITED STATES PATENT OFFICE 2,215,704

HYDROGEN FLUORIDE TREATMENT OF RUBBER

Elbert C. Ladd, Highland Park, and Nicholas J. Rakas, Royal Oak, Mich., assignors to Chrysler Corporation, Highland Park, Mich., a corporation of Delaware Application January 20, 1938, Serial No. 185,798

6 Claims. (Cl. 260—771)

This invention relates to improved rubber containing articles and to an improved method of manufacturing the same.

More particularly, the invention pertains to hardening of selected portions of rubber or a rubber containing structure.

One of the main objects of the invention is to provide in rubber or rubber containing articles selected relatively soft and comparatively hard portions at predetermined locations.

Another object of the invention is the provision of an improved method of hardening the entire or selected portions of a rubber article throughout or over its entire exposed surface.

Another object of the invention is the provision of an improved method for hardening selected portions of a rubber containing structure after molding and substantial vulcanization thereof or after the rubber has been vulcanized to a final desired extent.

A further object of the invention is to provide a process of this character by which selected portions of an unvulcanized rubber body may be hardened.

Still further objects of the invention are the provision of articles having substantial hardened surface areas at selected locations immediately adjacent surface portions of a comparatively softer state; to provide hardened surface portions on articles of this character which are integrally united with the comparatively yieldable portion thereof and which have a smooth finish adapted to be buffed to a luster; to provide localized hardened surface portions in rubber articles which will withstand mechanical abrasion and the action of weather, and many alkaline and acid substances and which can withstand substantial flexure without cracking; and to provide localized hardened rubber surfaces of this character which may be formed on those portions of a rubber body that are exposed to oil in order to resist the destructive action thereof without sacrifice of the yieldable properties of the remaining portions of the structure.

A still further object of the invention is to provide an improved process of this character by which localized portions of a rubber body may be hardened throughout or to a predetermined depth.

Additional objects of the invention are the provision of a treatment for articles made in accordance with our invention which will eliminate any undesirable unreacted hardening agent and which will restore the hardened rubber substantially to a color corresponding to the color of the composition from which it was made; to provide improved hard rubber of diverse uniform and nonuniform colors and an improved method of making the same; to provide adjacent portions of hard and soft rubber which are substantially matched in color; and to provide substantially transparent or translucent hard rubber products.

Illustrative embodiments of the invention are shown in the accompanying drawing in which.

Figure 1:
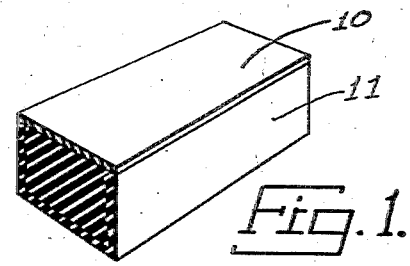
Fig. 1 is a perspective view, partly in section, of a rubber body prepared in accordance with our invention for hardening of selected portions thereof.
Figure 2:
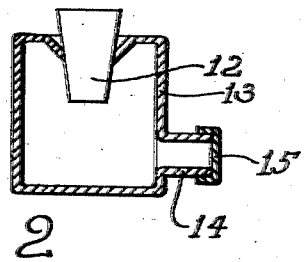
Fig. 2 is a diagrammatic vertical sectional view illustrating another way of preparing a rubber body for selective hardening treatment.

In the practice of our improved method of hardening localized selected portions of a rubber body and in the manufacture of articles of this character, the articles may be molded to a desired shape and completely or partially vulcanized to the extent desired in the final product. Those portions of the rubber body part of the rubber constituent of the article which it is desired to retain in an unhardened state may be covered, confined or otherwise protected from the action of the hardening agent, hereinafter set forth, in any suitable manner. This may be accomplished as illustrated in Fig. 1 by applying a thin film-like coating 10 of wax, grease or other similarly pliable material which will prevent the hardening agent from acting upon the underlying rubber structure 11 and which preferably is itself unaffected by the hardening medium. Those portions of the article which are not to be hardened may be protected, as shown in Fig. 2, by press-fitting the article 12 in an opening of a suitable container 13 comprising metal or any other solid material on which the hardening agent does not have an excessively destructive action, with the portions of the article to be protected from the hardening agent confined within the container and the portions thereof to be hardened exposed for treatment. The container 13 may be provided with an inlet spout 14 fitted with a closure 15 and when the external part of the article 12 is to be hardened the container and article may be placed in a chamber or tank containing the hardening agent. If desired, the portions to be protected from the agent may be disposed externally of the container and the hardening agent may be admitted to the interior thereof through the spout 14.

Figure 3:
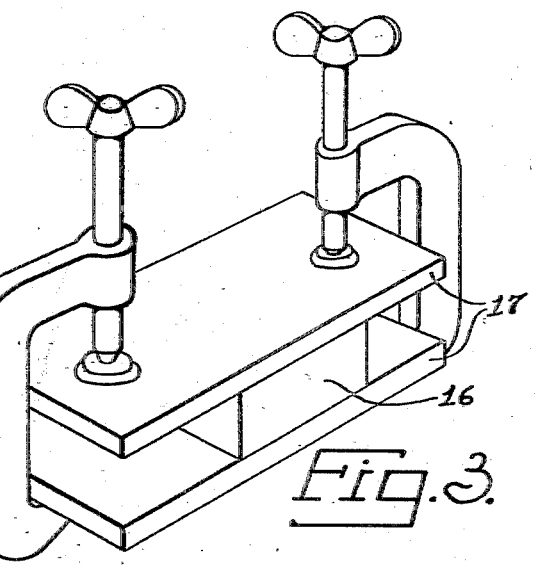
Fig. 3 is a diagrammatic perspective view illustrating an additional way of preparing a rubber body for selective hardening.
Figure 4:
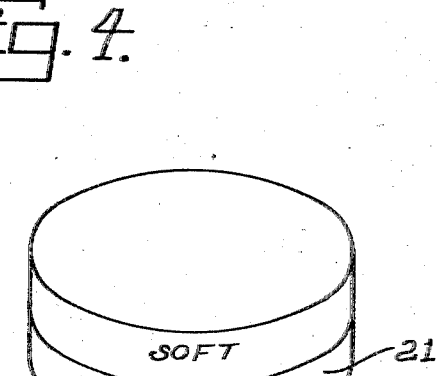
Fig. 4 is an elevational view of an assembly of similar articles prepared for hardening of selected portions thereof.

The particular manner by which portions of a rubber body are protected from the hardening agent may vary in accordance with the construction of the article under treatment. In some cases selected surfaces of an article 16 may be protected from the hardening agent, as illustrated in Fig. 3, by clamping plates 17 thereon and in other cases articles 18 may be arranged as shown in Fig. 4, with the portions to be protected from the agent in contacting relationship. When metal shielding is employed, lead or steel are preferable but other metals or non-metallic compositions may be used and, if desired, the exposed surfaces thereof may be coated with grease or wax. The contacting surfaces may be urged together by suitable clamping means such as a threaded member 19 and nuts 20.

Rubber bodies, articles or articles containing rubber bodies which have been treated in any of the foregoing ways may be then placed in an atmosphere of hydrogen fluoride or hydrofluoric acid vapor and allowed to remain therein for a period of time commensurate with the depth of hardening desired. This operation may be conducted in any suitable closed container.

The foregoing treatment of localized portions of a rubber structure may be accomplished, and articles may be hardened throughout, or case hardened by formation of a hard envelope over their entire surfaces by dipping rubber articles in a solution containing liquid hydrogen fluoride or hydrofluoric acid and suitable salts of alkali metals, such as potassium fluoride, sodium fluoride and other halide salts of alkali metals. This dipping operation can be conducted at room temperature but is preferably conducted at lower temperatures to prevent excessive fuming. It is found that the foregoing salts reduce the tendency of liquid hydrofluoric acid to volatilize and also prevents cracking and distortion of the finished product. The solutions of salts and liquid hydrofluoric acid may be diluted with water or other compatible liquids. The following is an example of one suitable dipping solution: 260 parts by weight of potassium fluoride dissolved in 50 parts by weight of hydrogen fluoride. The period of treatment of rubber in this solution depends upon the depth of hardening desired.

Rubber articles which have been subjected to any of the foregoing hardening treatments may be freed from excess unreacted hardening agent by further heating the articles with a suitable basic compound. This may be rapidly accomplished by subjecting the articles to the action of ammonia gas under pressure, preferably of from 50 to 125 pounds per square inch. While further penetration is secured by the use of ammonia gas under pressure, satisfactory results can be obtained by dipping the articles in aqueous ammonia or other basic solutions.

When sufficient time is available or when the thickness of the hardened rubber is comparatively limited, the excess hydrofluoric acid may be removed by soaking the articles in water of any desired temperature.

While at this time the precise reaction which takes place between the rubber compound and the hydrogen fluoride is not known with certainty, it is found that the foregoing treatments of hydrogen fluoride treated rubber restores the treated rubber substantially to its previous color. It is believed that the treatment of rubber with hydrogen fluoride results in isomerization of the rubber to a hard state and that the presence of excess unreacted hydrogen fluoride or elements thereof combined with rubber produce a darker coloration which can be removed by eliminating free hydrogen fluoride and breaking down any combinations thereof or of its elements with the rubber.

Figure 6:
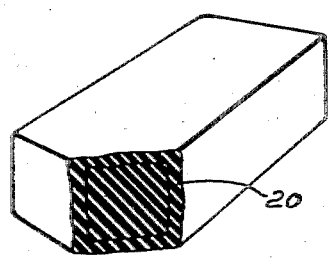
Fig. 6 is a fragmentary perspective view of an article having a hardened skin-like exterior.
Figure 5:
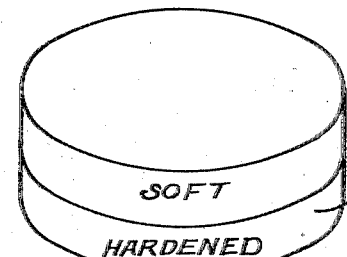
Fig. 5 is a perspective view of an article having portions thereof hardened in accordance with the invention.

Rubber articles or rubber portions of articles treated in accordance with our invention may harden throughout or to a desired depth as shown at 20 in Fig. 6, and such hardening may be confined to localized areas as illustrated at 21 in Fig. 5, or extended throughout the entire outer surface, as shown in Fig. 6. The particular nature of the hardened rubber compound is such that it resists the action of oil and many other both acid and alkali compounds as well as atmospheric weathering and mechanical abrasion. The hardened material is integrally bonded to the adjacent softer material and it does not readily crack when exposed to weather and sunlight.

Either of the foregoing treatments may be utilized to produce transparent hard rubber either throughout a rubber body or over its entire or selected portions of its surfaces. This may be accomplished by using a suitable transparent soft rubber composition and subjecting it to the action of hydrogen fluoride as previously set forth. The following is one example of a suitable transparent soft rubber compound.

| | Parts by weight |
|---|---|
| Rubber | 100 |
| Stearic acid | 2 |
| Zinc oxide | 1 |
| Sulpur | 2 to 3 |
| Mercaptobenzothiazole | 1 |

Certain synthetic rubbers, such as polymerized butadiene compounds and its derivatives when treated in accordance with our invention produce satisfactory hard rubber-like compositions.

Although several specific embodiments of the invention are herein shown and described, it will be understood that various changes in the size, shape and arrangement of parts may be made without departing from the spirit of our invention.

We claim:

1. The method of hardening rubber and rubber-like materials which comprises subjecting the same to the action of a hardening agent comprising a solution of an alkali metal fluoride in liquid hydrogen fluoride.

2. The method of hardening rubber and rubber-like materials which comprises subjecting the same to the action of a hardening agent comprising a solution of a potassium fluoride in liquid hydrogen fluoride.

3. The method of hardening rubber and rubber-like materials which comprises subjecting the same to the action of a hardening agent comprising a solution of a sodium fluoride in liquid hydrogen fluoride.

4. A rubber hardening agent comprising a solution of an alkali metal fluoride in liquid hydrogen fluoride.

5. A rubber hardening agent comprising a solution of a potassium fluoride in liquid hydrogen fluoride.

6. A rubber hardening agent comprising a solution of sodium fluoride in liquid hydrogen fluoride.

ELBERT C. LADD.
NICHOLAS J. RAKAS.